United States Patent Office 3,427,471
Patented Feb. 11, 1969

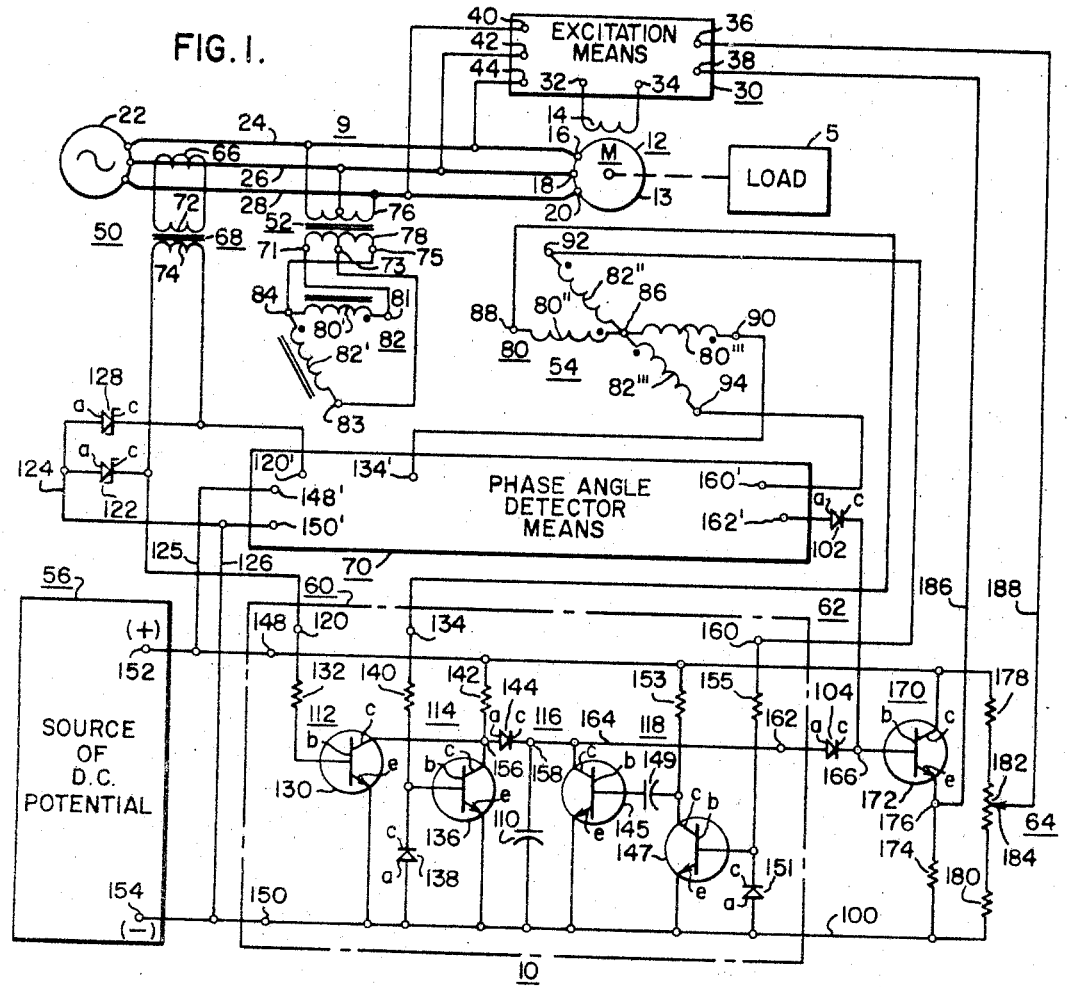

3,427,471
PHASE ANGLE DETECTOR
William H. South, McKeesport, Pa., assignor to Westinghouse Electric Corporation, Pittsburgh, Pa., a corporation of Pennsylvania
Filed Nov. 23, 1965, Ser. No. 509,359
U.S. Cl. 307—232                                        8 Claims
Int. Cl. H03k *5/20*

ABSTRACT OF THE DISCLOSURE

A phase angle detector which provides a unidirectional output signal responsive to the phase angle between first and second alternating signals, including a capacitor, a source of unidirectional potential, means which initiates the charging of the capacitor from the source of unidirectional potential when one of the signals changes from a first to a second polarity, and means which stops the charging of the capacitor when the other of the signals changes from the second to the first polarity. The charge on the capacitor is proportional to the phase angle between the first and second signals.

---

This invention relates in general to electrical apparatus for detecting or sensing the phase angle between two signals of fixed frequency, and more particularly to detector apparatus, which generates a direct current potential proportional to the phase angle between two signals.

The phase angle between the voltage and current waveforms of an alternating current system, is generally measured by vectorially adding signals proportional to the voltage and current. The resultant signal is approximately proportional to the phase angle between the circiut voltage and current. The resultant signal, however, is an alernating potential which requires rectification and filtering in order to obtain a direct current potential proportional to phase angle. The direct current potential may then be used to control the excitation current of a synchronous motor to regulate the power factor of an alternating current system. The filtering of the alternating potential introduces an undesirable time delay and phase shift, however, which makes the resulting signal generally unsuitable for use with the presently available high speed excitation systems, as unstable operation results. In addition to the instability disadvantage, changes in the magnitude of the voltage and/or current, or an unbalance between the phase voltages in a polyphase system, introduces errors into the output signal.

Thus, it would be desirable to provide a new and improved phase angle detector which has a high speed response to chanegs in the phase angle between two signals, has no ripple component, is unaffected by the magnitude of the signals, is unaffected by the phase or voltage unbalance in polyphase systems, and which generates a direct current signal proportional to phase angle without first genertaing an alternating potential which requires rectification and filtering.

Accordingly, it is an object of the invention to provide a new and improved phase angle detector which generates a direct current potential proportional to the phase angle between two signals of a predetermined fixed frequency.

A further object of the invention is to provide a new and improved phase angle detector which has a high speed response to changes in the phase angle between two signals, and which provides a direct current potential proportional to phase angle, independent of changes in the magnitude of the two signals, and independent of phase unbalance in polyphase systems.

Still another object of the invention is to provide new and improved electrical apparatus for measuring the phase angle between the voltage and current waveforms of an alternating current circiut, which directly provides a unidirectional signal having a magnitude proportional to the phase angle.

Briefly, the present invention accomplishes the above-cited objects by measuring the time difference between predetermined zero points of two signals, such as the time difference between a voltage wave zero and a current wave zero of an alternating current circuit. At a fixed frequency, the time difference between predetermined zero points of the waveforms is equal to a definite phase angle. In order to obtain a pure direct current signal proportional to phase angle between first and second signals, energy storage means, such as a capacitor, is used to develop the signal. When the first signal leads the second signal, the capacitor is charged at a linear rate from a regulated source of unidirectional potential when the second signal changes from a first to a second polarity, and the charging of the capacitor is stopped when the first signal changes from the second to the first polarity. The charge on the capacitor at the termination of the charging period is directly proportional to the phase angle between the two signals. When the second signal leads the first signal, the first signal starts the charging of the capacitor, and the charging is stopped by the second signal. Just prior to the changing of one of the signals from the first to the second polarity, the capacitor is discharged to reset the circuit. In order to provide a continuous signal, with no interruptions due to the resetting operation, as well as to reduce the response time of the circuit to a maximum of one half cycle, two similar circiuts may be used. The first circuit is responsive to the first and second signals, and the second circuit is responsive to signals which are 180° out of phase with the first and second signals. Auctioneering means is utilized to select the larger of the output signals from the two circuits. The direct current potential output signal may be fed to a phase angle indicating means or a power factor meter. The output signal may also be compared with a reference signal to develop an error signal which may be used to control the excitation current of a synchronous motor, and thus regulate the phase angle between the voltage and current in an electrical system; or, the error signal may be used to control the switching of capacitors or reactors, in response to the phase angle between the voltage and current in an electrical power system, in order to regulate the power factor of a generator, transmission line, or plant power factor.

Further objects and advantages of the invention will become apparent as the following description proceeds and features of novelty which characterize the invention will be pointed out in particularity in the claims annexed to and forming a part of this specification.

For a better understanding of the invention, reference may be had to the following detailed description taken in connection with the accompanying drawings, in which:

FIGURE 1 is a schematic diagram illustrating the teachings of the invention;

FIG. 3 is a graph which illustrates how the magnitude of the output signal from the circuit shown in FIG. 1 varies with the phase angle between two signals.

Figure 2A:
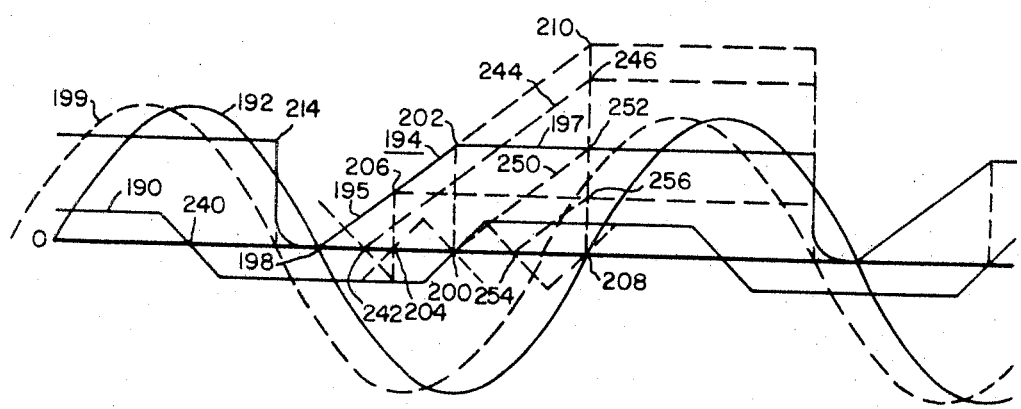
FIGS. 2A and 2B are graphs which illustrate the operation of the circuit shown in FIG. 1.

Referring now to the drawings, and FIG. 1 in particular, there is illustrated a phase angle detector circuit 10 which embodies the teachings of the invention. FIG. 1 illustrates the phase angle detector 10 being used to regulate the power factor of an electrical circuit 9 to which a synchronous motor 12 is connected, but it is not limited to this specific application. The detector 10 is also useful in indicating the power factor of a circuit through a power factor meter, regulating the power factor of an alternating current generator, transmission line, or load by controlling the introduction and removal of inductance and capacitance, or indicating the phase angle between any two signals of fixed frequency, whether the signals are current signals, voltage signals, or a voltage and current signal.

In the embodiment of the invention shown in FIG. 1, synchronous motor 12 includes an armature 13, excitation winding 14, and armature terminals 16, 18 and 20. The synchronous motor 12 may be mechanically connected to a load 15, if desired, or it may be operated at no-load solely for power factor correction purposes. The synchronous motor 12 has its armature terminals 16, 18 and 20 electrically connected to a source of alternating potential 22 through transmission lines or conductors 24, 26 and 28, respectively, which make up the electrical circuit 9 whose power factor is to be regulated.

Excitation winding 14 of synchronous motor 12 is connected to excitation means 30 at terminals 32 and 34. Excitation means 30 supplies direct current to excitation winding 14, with the magnitude of the current being responsive to an error signal applied to its terminals 36 and 38 from phase angle detector circuit 10. The direct current potential for excitation winding 14 may be obtained from a separate source, or, as shown, the excitation means 30 may have its terminals 40, 42 and 44 connected to electrical conductors 24, 26 and 28, respectively, and include its own rectifier circuit. For example, the excitation means 30 may include a rectifier bridge arrangement which includes controlled rectifiers in certain legs thereof, and a firing circuit for the controlled rectifiers which is responsive to the error signal applied to terminals 36 and 38. This latter arrangement is shown and described in detail in U.S. Patent 3,211,987 issued Oct. 12, 1965, and will not be described in detail herein.

The phase angle detector 10 includes means 50 for provided first and second signals 180° out of phase with one another, and responsive to the phase of the current of circuit 9, means 52 for providing third and fourth signals 180° out of phase with one another, and responsive to the phase of the voltage of circuit 9, means 54 for providing fifth and sixth signals 180° out of phase with one another and leading the third and fourth signals, respectively, by a predetermined number of electrical degrees, means 56 for providing a unidirectional potential, a first phase angle detector circuit 60 for providing a first unidirectional potential output signal starting each alternate half cycle of the voltage of circuit 9, with the magnitude of the first unidirectional output signal being responsive to the phase angle of circuit 9, a second phase angle detector circuit 70 for providing a second unidirectional signal starting each of the remaining alternate half cycles of the voltage of circuit 9, and whose magnitude is responsive to the phase angle of circuit 9, auctioneering means 62 for selecting the larger of the first and second signals from the first and second phase angle detector circuits 60 and 70, respectively, and reference means 64 for providing a reference signal which may be compared with the signal from auctioneering means 62 to provide an error signal having a magnitude and polarity responsive to the difference between the signals.

Specifically, means 50 for providing the first and second signals may include a current transformer 66 disposed in inductive relation with one of the circuit conductors, such as conductor 26, and an auxiliary current transformer 68 having a first winding 72 connected to current transformer 66, and a second winding 74. One end of winding 74 is connected to detector means 60 to provide the first signal, and the other end is connected to detector means 70 to provide the second signal. Thus, the signals applied to detector means 60 and 70 are 180° out of phase with one another.

Means 52 for providing the third and fourth signals may be a potential transformer 52 having a first winding 76 connected to conductors 24, 26 and 28, and a second winding 78 having output terminals 71, 73 and 75, and a transformer 80 having a primary winding 80' and secondary windings 80" and 80'''. Secondary windings 80" and 80''' are connected together at junction 86, and the remaining ends are connected to output terminals 88 and 90. Primary winding 80' has its terminals 84 and 81 connected in circuit relation with terminals 75 and 71 of potential transformer winding 78, respectively. Terminals 88 and 90 provide the third and fourth signals, respectively, and are connected to terminals 134 and 134' of phase angle detector circuits 60 and 70, respectively.

Means 54 for providing the fifth and sixth or reset signals a predetermined period of time prior to the third and fourth signals may be a transformer 82. Transformer 82 has a primary winding 82', which has a terminal 84 in common with winding 80' of transformer 80, and a terminal 83 connected to terminal 71 of potential transformer 52. Transformer 82 also has secondary windings 82" and 82''' connected to junction 86 between windings 80" and 80''' of transformer 80, and having output terminals 92 and 94. Output terminals 92 and 94 provide the fifth and sixth signals to terminals 160 and 160', respectively, of phase angle detector circuits 60 and 70. The third and fourth signals at the ends of transformer windings 80" and 80''' are 180° out of phase with one another and the fifth and sixth signals at the ends of transformer windings 82" and 82''' are 180° out of phase with one another, by virtue of their transformer connections. Transformer 80 may provide signals in phase with the signals from potential transformer 52, and transformer 82 is disposed and connected to provide signals a predetermined number of electrical degrees ahead of the signals provided by transformer 80. Transformer 82 provides reset signals for resetting phase angle detector circuits 60 and 70 just prior to the start of each voltage cycle of the third and fourth signals. For reasons which will be hereinafter described, it may be desirable to connect transformer 80 to shift the third and fourth signals appearing at terminals 88 and 90 of transformer 80 a predetermined number of electrical degrees from the phase of the signals being provided by potential transformer 52.

The phase angle detector means 60 and 70 for providing first and second unidirectional signals proportioned to the phase angle between the voltage and current of electrical circuit 9 are similar in construction, making it necessary to only show and described one of them in detail, such as detector means 60. The two similar detector means 60 and 70, which initiate unidirectional discontinuous signals alternately on successive voltage half cycles, are utilized in order to prevent a discontinuity in the output signal while the circuits are resetting, and in order to provide a phase angle detector system having a maximum response time of one-half cycle. Since the reset time is constant, once selected, if the intended usage of the phase angle detector is such that a response time of one cycle would be sufficient, and the usage is such that a discontinuity in the signal would not be deleterious, it would only be necessary to use one detector means, such as detector means 60. When two similar detector means or circuits are utilized, operating alternately on successive voltage half cycles, as shown in FIG. 1, the outputs of the detector means are connected to auctioneering circuit 62 which selects only the larger of the two undirecttional signals to be compared with the reference signal from reference means 64. Auctioneering circuit 62 may be formed by connecting the output terminal means of detector means 60 and 70 in parallel with respect to a common conductor 100, through diodes 102 and 104. The diode connected to the phase angle detector circuit providing the larger of the two signals will be conductive, the diode connected to the circuit providing the lesser of the two signals will be blocking. Thus, when the larger output signal is dropped to zero for resetting purposes, the other output signal will automatically be selected to be compared with the reference signal.

By using two similar detector circuits, which are responsive to signals 180° out of phase with one another, in addition to providing a continuous output signal, the response time of the system is reduced to a maximum of one half cycle. If the circuit phase angle changes in the direction of providing a unidirectional signal of lesser magnitude, the lesser magnitude signal will wait a maximum of one half cycle until the other siganl drops to zero when it resets, and the lesser signal will then be compared with the reference signal. If the circuit phase angle changes in the direction of providing a unidirectional signal of larger magnitude, the larger signal will immediately block out the lesser signal and be compared with the reference signal without being required to wait for the resetting of the smaller signal. The circuit 9 is thus being sampled every half cycle, with a "bit" of information concerning the phase angle of circuit 9 being sent to auctioneering circuit 62 every half cycle.

The unidirectional potential proportional to the phase angle of circuit 9 is developed, without regard to the magnitude of the circuit current and voltage or any phase unbalance, by initiating the charging of energy storage means, such as capacitor 110 shown in phase angle detector means 60, from a source of direct current potential 56 when the voltage of electrical circuit 9 goes through zero from a first polarity to a second polarity, and stopping the charging of capacitor 110 when a voltage signal responsive to the phase of the current of circuit 9 goes through zero from the second polarity to the first polarity. The time between predetermined zero points of the current and voltage waveforms of circuit 9 is directly proportional to the phase angle, and thus to power factor, and the charge on the capacitor at the end of the charge time is proportional to the phase angle. If the circuit current is in maximum lead, the charging time will be substantially zero. As the current drops back from maximum lead the charging time increases, becoming a maximum when the current is in phase with the voltage. When the current lags the voltage, the charge on the energy storage means becomes less, with the greater the angle of lag, the less the charge, until at 180° lag, the charge will be substantially zero.

The phase angle detector means 60 comprises means 112 responsive to the first signal whose phase is responsive to the phase of the current of circuit 9, means 114 responsive to the third signal whose phase is responsive to the phase of the voltage of circuit 9, means 116 for storing electrical energy in response to the time between predetermined zero points of the first and third signals, including the hereinbefore mentioned energy storage means or capacitor 110, and means 118 responsive to the fifth signal which leads the third signal by a predetermined number of electrical degrees, to discharge the capacitor 110 and reset phase angle detector means 60 once each cycle of the third signal.

More specifically, means 112 includes a terminal 120 which is connected to one side of a winding 74 of current transformer 68 and to means 122 for loading the current transformer 68, to thus receive the first signal whose phase is responsive to the phase of the current of circuit 9. Means 122 may be a Zener diode having cathode and anode electrodes, $c$ and $a$, respectively, with the cathode electrode being connected to terminal 120 and the anode electrode being connected to common conductor 100 through conductors 124 and 126. The remaining side of winding 74 of current transformer 68 is loaded by means 128, which also may be a Zener diode connected in a manner similar to means 122, and connected to terminal 120' of detector means 70. The first and second signals applied to terminal 120 of detector means 60 and terminal 120' of the similar detector means 70, respectively, being from opposite ends of the same winding, are 180° out of phase. If loading means 122 and 128 are Zener diodes, as illustrated in FIG. 1, in addition to loading the current transformer 68 they protect means 112 by limiting the magnitude of the applied signal. Means 112 also includes solid state or semiconductor switching means 130, which may be an NPN junction type transistor having a base electrode $b$, a collector electrode $c$ and an emitter electrode $e$. The base electrode $b$ is connected to terminal 120 through current limiting resistor 132, and the emitter electrode $e$ is connected to the common conductor 100.

Means 114 includes a terminal 134 which is connected to terminal 88 of winding 80" of transformer 80, in order to receive the third signal whose phase is responsive to the phase of the voltage of circuit 9. Terminal 90 of transformer 80, which provides the fourth signal which is 180° out of phase with the signal applied to terminal 134, is applied to terminal 134' of phase angle detector means 70. Means 114 also includes semiconductor switching means 136, which may be an NPN transistor having base, collector and emitter electrodes $b$, $c$ and $e$, respectively, protective means 138 for the base-emitter junction of transistor 136, which may be a diode having cathode and anode electrodes, $c$ and $a$, respectively, and a current limiting resistor 140. The base electrode $b$ of transistor 136 is connected to terminal 134 through current limiting resistor 140 and to common conductor 100 through diode 138, which has its cathode electrode $c$, connected to the base electrode $b$, and its anode electrode $a$ connected to common conductor 100. The emitter electrode $e$ is also connected to common conductor 100, and the collector electrode $c$ is connected to the collector electrode $c$ of transistor 112.

Means 116 for storing electrical energy and providing a unidirectional signal proportional to the phase angle of circuit 9 includes resistor 142, diode 144 having anode and cathode electrodes, $a$ and $c$, respectively, and capacitor 110. Resistor 142, diode 144, and capacitor 110 are connected serially across the input terminals 148 and 150 of detector means 60, which in turn are connected to the positive and negative output terminals 152 and 154, respectively, of direct current potential source 56. Similar input terminals 148' and 150' of detector means 70 are also connected to terminals 152 and 154 of source potential 56, through conductors 125 and 126. The negative terminal 154 of source potential 56 forms the common connection for the complete detector circuit 10 through conductors 100, 126 and 124.

Resistor 142 has one end connected to terminal 148 and one end connected to the anode electrode $a$ of diode 144 at terminal 156. Diode 144 has its cathode electrode $c$ connected to capacitor 110 at terminal 158, and capacitor 110 has its remaining side connected to terminal 150 through common conductor 100. Terminal 156 is connected to the collector electrodes $c$ of transistors 112 and 114. Terminal 158 is connected to reset means 118. Thus, as will hereinafter be described in greater detail, means 116 includes an RC circuit comprising resistor 142 and capacitor 110 connected across the output of source potential 56, which should be a regulated supply of unidirectional potential. Means 116 is controlled by means 112 and 114 to start and stop the charging of capacitor 110 according to the phase angle condition of circuit 9, and means 118 resets the circuit each cycle by discharging the capacitor 110.

Reset means 118 includes a terminal 160 which is connected to terminal 92 of transformer 82, and thus receives the fifth signal which leads the third signal from terminal 88 by a predetermined number of electrical degrees to discharge capacitor 110 and reset detector means 60 just prior to the zero point of the third signal. Reset means 118 also includes semiconductor switching means, such as transistors 145 and 147, each having base, collector and emitter electrodes $b$, $c$ and $e$, respectively, a capacitor 149, a diode 151 having a cathode $c$ and an anode $a$, and resistors 153 and 155. Transistor 145 has its emitter electrode $e$ connected to conductor 100, its collector electrode $c$ connected to capacitor 110 at terminal 158, and its base electrode $b$ connected to the collector electrode c of transistor 147 through capacitor 149. Transistor 147 has its emitter electrode e connected to conductor 100, its collector electrode c connected to the positive terminal 152 of source potential 56 through resistor 153, and its base electrode b connected to terminal 160 through current limiting resistor 155. Diode 151 is connected across the base-emitter electrodes of transistor 147 for protecting this junction. The sixth signal, which is 180° out of phase with the fifth signal, is developed at terminal 94 of transformer 82 and is applied to terminal 160' of detector means 70.

The charge or signal on capacitor 110, which is proportional to the phase angle of electrical circuit 9, is applied from terminal 158 to terminal 162 through conductor 164. In like manner, the output signal from detector means 70 is applied to terminal 162'. Terminals 162 and 162' are connected to auctioneering means 62, which may include diode 104 having an anode electrode a connected to terminal 162 and a cathode electrode c, and a diode 102 which has an anode electrode a connected to terminal 162' and a cathode electrode c connected to the cathode electrode c of diode 104 at terminal 166. Only the larger of the signals from terminals 162 and 162' will appear at terminal 166.

The output signal from auctioneering means 62 appearing at terminal 166 may be applied to amplifying means 170, which may include an NPN transistor 172 having a base electrode b connected to terminal 166, an emitter electrode e connected through resistor 174 to conductor 100, and a collector electrode c connected to the positive terminal 152 of source potential 56. The amplified output signal from amplifier means 170, which may be of the emitter follower type shown, appears at the emitter electrode e and terminal 176, and is a unidirectional signal proportional to the phase angle of circuit 9. In order to provide a reference unidirectional potential which may be compared with the signal at terminal 176 and develop a polarized error signal, reference means 64, including fixed resistors 178 and 180 and adjustable resistor 182 having a movable contact arm 184, may be serially connected to terminals 152 and 154 of source potential 156. Thus, by connecting a conductor 186 to terminal 176 and a conductor 188 to movable contact arm 184 of resistor 182, a polarized direct current error signal will appear across the conductors which may be applied to terminals 36 and 38 of excitation means 30.

Figure 2B:
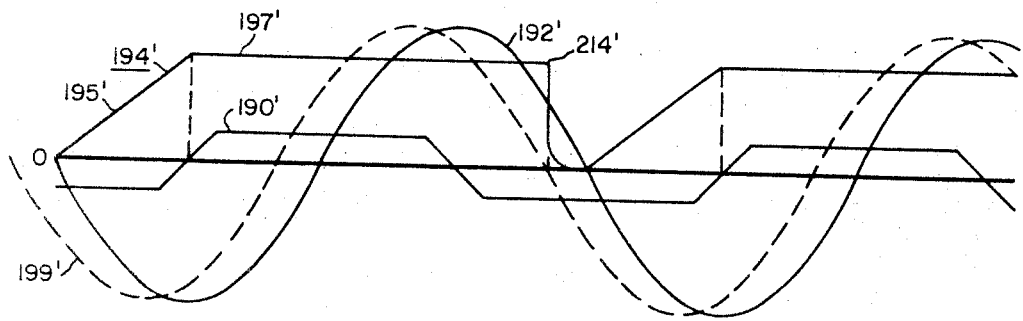

In the operation of detector means 60 and 70, the graphs in FIGS. 2A, 2B and 3 will be referred to. FIG. 2A is a graph illustrating the waveforms appearing in detector means 60. Specifically, FIG. 2A illustrates a waveform 190 corresponding to the first signal which is responsive to the phase of the current in circuit 9, a waveform 192 corresponding to the third signal which is responsive to the phase of the voltage in electrical circuit 9, a waveform 199 shown in dotted outline which corresponds to the fifth signal which leads the third signal by a predetermined number of electrical degrees, and a waveform 194 which illustrates the charging slope 195 and the steady state output signal 197 of capacitor 110. FIG. 2B illustrates similar waveforms for detector means 70, including the second, fourth and sixth signals, with the reference numerals including a prime mark to distinguish them from the corresponding signals in FIG. 2A. It should be noted that the waveform of FIGS. 2A and 2B are 180° out of phase with one another, due to the predetermined manner of developing and connecting the signals to the detector means 60 and 70. FIG. 3 is a graph which illustrates the magnitude of the charge voltage on capacitor 110, when the current is leading, in phase with, and lagging the voltage of electrical circuit 9.

Specifically, the third signal corresponding to the waveform 192 in FIG. 2A is applied to terminal 134 of phase angle detector means 60. The third signal, as hereinbefore stated, is a voltage whose phase is responsive to that of the voltage of circuit 9. While the third signal is positive, transistor 136 will be saturated and thus in its conductive or "full-on" condition, shunting capacitor 110 and preventing it from charging. At the instant the third signal 192 goes negative at point 198, transistor 136 will be switched to its non-conductive condition, allowing capacitor 110 to charge through resistor 142 up the RC charging ramp 195 of capacitor voltage waveform 194. The source potential 56 is selected to be of a sufficiently large magnitude to charge capacitor 110 in a substantially linear manner. When the first signal applied to terminal 120 in FIG. 1, and represented by waveform 190 in FIG. 2A, changes from negative to positive polarity at point 200, the first signal switches transistor 130 to its conductive or "full-on" condition, shunting capacitor 110 and stopping the charging at point 202 on the charging ramp 195. Diode 144 prevents capacitor 110 from discharging through transistor 112, thus maintaining the charge potential on capacitor 110, represented by point 202 and the horizontal line 197 in FIG. 2A. The magnitude of the charge potential is directly proportional to the phase difference between the voltage and current of electrical circuit 9, and is the output signal applied to output terminal 162. It will be noted by observing FIG. 2A that if the current responsive waveform 190 were to lead the voltage responsive waveform 192 by 180°, the starting and stopping point for the charging of capacitor 110 would coincide, and capacitor 110 would not be charged. As the waveform 190 drops back slightly from 180° lead to cross the zero line from negative to positive at point 204, the capacitor will charge to a value indicated by point 206 on the charge ramp 195. When the current is in phase with the voltage at zero point 208, capacitor 110 will charge for one half cycle to point 210 on charging ramp 195.

If the current lags the voltage, the mode of operation changes. Instead of the voltage and current responsive signals starting and stopping the charging of capacitor 110, respectively, the current responsive signal starts the charging, and the voltage responsive signal stops it. When the positive to negative zero point 240 of the current responsive signal 190 drops back to lag zero point 198 of voltage signal 192, the current waveform will be positive after the voltage responsive waveform 192 has become negative, thus transistor 130 is still conducting after the voltage responsive signal has switched transistor 136 to its non-conductive condition, and capacitor 110 will not begin to charge until the current responsive signal 190 goes through zero from positive to negative. For example, if the current signal 190 is only slightly lagging the voltage signal 192, with the positive to negative zero point of current signal 190 being at point 242, transistor 130 will be switched "off" at point 242, allowing capacitor 110 to charge along ramp 244 to the magnitude represented by point 246. It will be noted that this magnitude is less than the "in phase" magnitude represented by point 210. The charging of capacitor 110 is terminated at point 246 due to the voltage signal 192 becoming positive at point 208, which switches transistor 136 to its conductive condition. When the current signal 190 lags the voltage signal 192 by 90 degrees, going from positive to negative at point 200, capacitor 110 will charge along ramp 250 to a magnitude represented by point 252, which is the same magnitude as point 202, which was provided when the current signal 190 led the voltage signal 192 by 90 degrees. When the current signal 190 lags the voltage signal 192 by 135 degrees, crossing zero from positive to negative polarity at point 254, capacitor 110 charges to a magnitude indicated by point 256, which is the same magnitude as when the current led the voltage by 135 degrees. When the current signal 190 drops back to 180 degrees lag, the charge on capacitor 110 will be zero.

In order to discharge capacitor 110 and reset the circuit just prior to the point voltage wavefore 192 goes through zero from positive to negative polarity, the fifth or reset signal from terminal 92 of transformer 82 is applied to terminal 160 of phase angle detector means 60. By virtue of its electrical connections relative to transformer 80, the fifth or reset voltage signal leads the third or voltage responsive signal from transformer 80 by a predetermined number of electrical degrees, such as 30 degrees. When the fifth or reset signal applied to terminal 160 goes from positive to negative polarity, just prior to point 198 where the third or voltage responsive signal 192 goes from positive to negative polarity, transistor 147 will be switched from a saturated or conductive condition to a non-conductive condition. When transistor 147 switches to its non-conductive condition, the voltage at its collector electrode $c$ will suddenly increase, which pulses the base electrode $b$ of transistor 145 through capacitor 149. The RC time constant of capacitor 149 and resistor 153 is selected to be sufficiently long to discharge capacitor 110 through transistor 145, to thus reset capacitor 110 and prepare it for the next cycle of operation. The RC time constant should be short enough to have terminated by the time the next charging ramp is to start. The discharge of capacitor 110 is indicated at point 214 at FIG. 2A.

If the unidirectional signal appearing at output terminal 162 is to be used to operate a phase angle or a power factor meter, the reset time would not cause any disadvantage, as the average unidirectional voltage would be proportional to phase angle or power factor. Thus, output terminal 166 could be connected to a phase angle or a power factor meter, through an implifier if desired, and the similar detector means 70 and reference circuit 64 would not be required. However, if the unidirectional signal appearing at output terminal 162 is to be used in a power factor regulating system, it would not only be desirable to eliminate the discontinuity in the output signal due to reset time, but it would be advantageous to make the system as fast operating as practical. These functions are provided by detector means 70, whose waveforms are shown in FIG. 2B, and which are 180° out of phase with the corresponding waveforms of detector means 60. Thus, by using auctioneering means 62 to always select the larger of the two signals from detector means 60 and 70, the reset time will not influence the unidirectional voltage appearing at output terminal 166. Further, the addition of detector means 70 reduces the response time of the detector system 10 from one cycle of the voltage of circuit 9 to a maximum of one half cycle. It will be noted by comparing FIGS. 2A and 2B that the reset times are 180° out of phase with one another, with the output signal of one of the detector means spanning or bridging the rest time of the other means.

In most applications the power factor of the circuit to be monitored or controlled will vary within a predetermined small range, such as from slightly lagging to slightly leading. The power factor detector system 10 may be made to operate on a predetermined portion of curve 270 shown in FIG. 3 by connecting transformers 80 and 82 to provide a voltage signal at terminals 88 and 90 which is out of phase with the current responsive signal provided by current transformer 68 by a predetermined angle, when the voltage and current of circuit 9 are in phase. For example, it is advantageous to operate on one of the straight line portions of curve 270, such as the straight line portion between points 272 and 274. This may be accomplished by connecting transformers 80 and 82 to deliberately shift the voltage responsive signal a predetermined angle ahead of the current responsive signal when the voltage and current waveforms of circuit 9 are in phase. Assuming that the angle chosen is 90°, the charge voltage on capacitor 110 shown in FIG. 3 will then correspond to the listing of phase angles in brackets, as the prior listing of values referred to would be shifted 90° to the left. Thus, all phase angles between 90 degrees lead and 90 degrees lag will fall upon the straight line portion of curve 270 between points 272 and 274. By appropriate connections of transformers 80 and 82, the operating portion on curve 270 may be shifted to any desirable location.

In addition to using the unidirectional signal appearing at terminal 162 to operate a phase angle meter, and in addition to using the error signal across terminal 176 and movable contact 184 of resistor 182 for controlling the excitation current of the synchronous motor to control the power factor of a predetermined electrical circuit, the error signal may also be applied to a switching circuit for switching capacitors or inductors for the purpose of controlling or regulating the power factor of a predetermined alternating current circuit.

While the invention has been shown and described as regulating the power factor of a three-phase electrical circuit, it is equally applicable to a single phase circuit, with inductors or capacitors being utilized to obtain the desired phase shift between the voltage responsive and reset signals, or to obtain an artificial shift of the operating point of the circuit along the charging ramp of capacitor 110.

While NPN junction type transistors have been shown in FIG. 1, it will be understood that PNP transistors may be used by reversing the polarity of the power supply 56, and reversing the diodes of the auctioneering means 62. Also, any other type of switching means may be used, such as controlled rectifiers and gate controlled switches.

The embodiment of the invention shown in FIG. 1 is concerned with measuring the phase angle between the voltage and current of an electrical circuit. It is to be understood that the invention is also applicable to measuring the phase angle between any two signals of fixed frequency. For example, the teachings of the invention may be incorporated in an automatic synchronizing system.

In summary, there has been disclosed a new and improved phase angle detector circuit 10 which provides a ripple free unidirectional potential proportional to the phase angle between two signals of fixed frequency. The disadvantages inherent in first generating an AC signal proportional to phase angle, and then rectifying and filtering it, are eliminated. There is no error introduced into the output signal by phase shift, such as caused by filter circuits. Further, the output signal is unaffected by changes in the magnitude of the two signals, or phase voltage unbalance in polyphase systems. The phase angle detector system is fast operating, responding to changes in phase angle in a maximum of one half cycle of the signal frequency. The output signal of the phase angle detector circuit may be compared with a reference signal, to develop an error signal for a phase angle regulator, which has a fast response time and which results in stable operation of the regulating system.

Since numerous changes may be made in the above-described apparatus and different embodiments of the invention may be made without departing from the spirit thereof, it is intended that all matter contained in the foregoing description or shown in the accompanying drawings shall be interpreted as illustrative, and not in a limiting sense.

I claim as my invention:

1. A phase angle detector for providing unidirectional output signals responsive to the phase angle between first and second alternating signals, comprising a first circuit including
    energy storage means,
    a source of unidirectional potential connected in circuit relation with said energy storage means,
    means initiating the charging of said energy storage means when one of said signals changes from a first to a second polarity,
    means for stopping the charging of said energy storage means when the other of said signals changes from the second to the first polarity,
    and output terminal means, the charge on said energy storage means being applied to said output terminal means.

2. The phase angle detector of claim 1 including means discharging said energy storage means a predetermined number of electrical degrees prior to the initiation of the charging of said energy storage means.

3. The phase angle detector of claim 1 including means discharging said energy storage means a predetermined number of electrical degrees prior to the initiation of the charging of said energy storage means, wherein said energy storage means is a capacitor, the means for initiating and stopping the charging of the capacitor are first and second solid state switching devices, and the means for discharging the capacitor are third and fourth solid state switching devices.

4. The phase angle detector of claim 1 including a second circuit similar to said first circuit, said second circuit initiating a unidirectional output signal 180° out of phase with the unidirectional output signals initiated by the first circuit, and auctioneering means connected to the output terminal means of said first and second circuits, said auctioneering means applying the larger of the output signals from said first and second circuits to third output terminal means.

5. The phase angle detector of claim 4 including means providing a reference signal, said reference signal being compared with the signal on said third output terminal means to provide an error signal whose magnitude and polarity are responsive to the deviation of the signal on said third output terminal means from said reference signal.

6. A phase angle detector for detecting the angle between first and second waveforms having a predetermined frequency comprising first means providing first and second alternating signals 180° out of phase with one another and phase responsive to the first waveform, second means providing third and fourth signals 180° out of phase with one another and phase responsive to the second waveform, a source of unidirectional potential, a first circuit connected in circuit relation with said first and third signals and said source of unidirectional potential, a second circuit connected in circuit relation with said second and fourth signals and said source of unidirectional potential, said first and second circuits each including a capacitor connected across said source of unidirectional potential, first and second switching means each connected across said capacitor, the first switching means in the first and second circuits being responsive to the first and second signals, respectively, the second switching means in the first and second circuits being responsive to the third and fourth signals, respectively, the first and second switching means in the first and second circuits being non-conductive when the first and second, and third and fourth signals, respectively, are of a first polarity, and conductive when they are of a second polarity, said capacitor in the first and second circuits starting to charge from said source of unidirectional potential when one of the signals applied thereto is of the first polarity and the other signal changes from the second to the first polarity, the charging of said capacitor in the first and second circuits stopping when one of the signals applied thereto changes from the first to the second polarity, means preventing said capacitor from discharging through said first and second switching means, means discharging said capacitor a predetermined number of electrical degrees prior to the point where said capacitor starts to charge, and terminal means connected to be responsive to the unidirectional charge on said capacitor, auctioneering means having output terminal means, said auctioneering means being connected in circuit relation with the terminal means of said first and second circuits and applying the larger of the unidirectional charges appearing at the terminal means in the first and second circuits to the output terminal means.

7. The phase angle detector of claim 6 including means providing a unidirectional reference signal, means comparing the reference signal with the unidirectional output signal appearing at said output terminal means to provide an error signal, and means responsive to the error signal regulating the angle between the first and second waveforms.

8. The phase angle detector of claim 6 wherein the first and second switching means, and the means for discharging the capacitor are solid state switching devices.

References Cited

UNITED STATES PATENTS

| | | | |
|---|---|---|---|
| 2,335,265 | 11/1943 | Dodington | 324—89 |
| 2,820,143 | 1/1958 | O'Nelly et al. | 307—295 |
| 3,054,062 | 9/1962 | Vonarburg | 328—155 XR |
| 3,283,174 | 11/1966 | Baude | 307—232 |

ARTHUR GAUSS, *Primary Examiner.*

S. T. KRAWCZEWICZ, *Assistant Examiner.*

U.S. Cl. X.R.

307—295; 328—133; 324—89; 318—179